United States Patent [19]
Patterson et al.

[11] Patent Number: 5,594,057
[45] Date of Patent: Jan. 14, 1997

[54] REVERSIBLY HEAT STIFFENING SUSPENSION

[75] Inventors: Burton R. Patterson; Jeffrey A. Horn, both of Birmingham, Ala.

[73] Assignee: University of Alabama Research Foundation, Birmingham, Ala.

[21] Appl. No.: 388,143

[22] Filed: Feb. 13, 1995

[51] Int. Cl.$^6$ .................................................. C08K 3/10
[52] U.S. Cl. ..................... 524/406; 524/413; 524/430; 524/437
[58] Field of Search .................................. 524/413, 430, 524/437, 406

[56] References Cited

PUBLICATIONS

Choi and Krieger, "Rheological Studies on Sterically Stabilized Dispersions of Uniform Colloidal Spheres", *J. Colloidal and Interface Science*, 1986, 113 (1), 94–113.

*Primary Examiner*—Edward J. Cain
*Attorney, Agent, or Firm*—Benjamin Aaron Adler

[57] ABSTRACT

The present invention provides a heat stiffening suspension, comprising: a polymer liquid; and solid particles, wherein said suspension is reversibly activated by temperature to change from a liquid-like state to a solid-like state. Also provided is a method of producing a heat stiffening suspension, wherein said suspension is reversibly activated by temperature to change from a liquid-like state to a solid-like state, comprising the step of contacting a polymer liquid with solid particles at an activating temperature. Further provided is a method of reversibly controlling the physical properties of particle-filled polymers from a fluid-like, viscous state to a solid-like, slightly elastic state in a reversible manner comprising the step of increasing the temperature of a mixture comprising a polymer liquid and solid particles to an activating temperature.

24 Claims, 11 Drawing Sheets

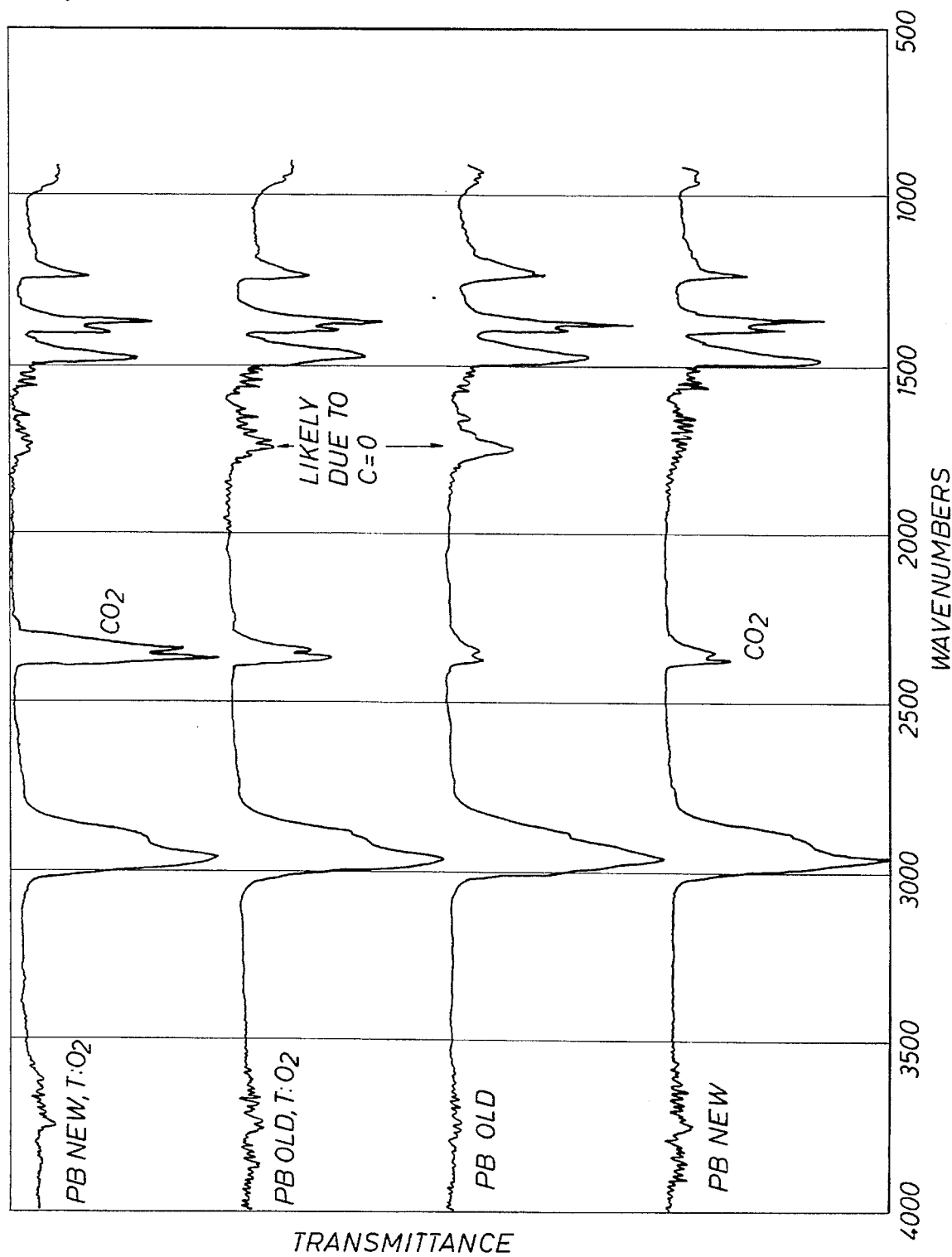

REVERSIBLY HEAT STIFFENING SUSPENSION

BACKGROUND OF THE INVENTION

1. Field of the Invention

The present invention relates generally to the fields of ceramics, powders, polymers and metallurgy. More specifically, the present invention relates to a thermally activated reversible suspension.

2. Description of the Related Art

Various types of suspensions that respond to environmental stimuli with a dramatic change in rheology have been described by the prior art, including (1) electro-rheological suspensions, (2) magneto-theological suspensions, (3) coagulated aqueous suspensions, (4) silica/syrup suspension.

In the 1940's, Willis M. Winslow reported the formation of interparticle chains within certain suspensions subjected to an electric field (U.S. Pat. No. 2,417,850, Mar. 25, 1947). The phenomenon Winslow described has several of the characteristics that have been observed for later suspensions. Winslow reported a suspension that, for instance, could be lifted from its container if held between charged electrodes, but was fluid in the absence of an electric field. The stiffening was said to be reversible "under action of shear". Electro-rheological fluids are said to be nearly Newtonian in the absence of an electric field, and to possess a yield point when electrified.

Nearly simultaneous to the discovery of the electro-rheological response was the observation of an analogous magneto-rheology. In magneto-rheological suspensions, the particles again link together in chains, induced by a magnetic rather than electric field. The properties of these fluids are apparently similar to those of electro-rheological suspensions.

A different type of system with interesting properties is the coagulated suspension of $Al_2O_3$ in water. In this suspension, an interparticle network can be formed by the addition of salt at low pH resulting in a pasty, shapable structure. The particles are said to be loosely held to one another so that they rearrange to pack tightly together during forming operation. The properties have not yet been reproduced for other powders besides $Al_2O_3$.

Another system reported to increase in viscosity with increasing temperature, is a suspension of fine silica particles in syrup. The viscosity of this suspension is said to increase with temperature because the adsorption of syrup molecules onto the silica The increases, adding to the effective volume of the particles. The suspension was never Newtonian, even at cool temperatures (19° C.) and very low solids content (7 vol %), so its behavior is not truly analogous to the other systems discussed above. No application was associated with this system.

The prior art is deficient in the lack of truly reversible fluid mixture of a polymer liquid and solid particles which is activated by temperature to change from a liquid-like state to a solid-like state and vice versa. The present invention fulfills this longstanding need and desire in the art.

SUMMARY OF THE INVENTION

In one embodiment of the present invention, there is provided a reversibly heat stiffening suspension, comprising: a polymer liquid; and solid particles, wherein said suspension is reversibly activated by temperature to change from a liquid-like state to a solid-like state.

In another embodiment of the present invention, there is provided a method of producing a reversibly heat stiffening suspension, wherein said suspension is reversibly activated by temperature to change from a liquid-like state to a solid-like state, comprising the step of contacting a polymer liquid with solid particles at an activating temperature.

In yet another embodiment of the present invention, there is provided a method of reversibly controlling the physical properties of particle-filled polymers from a fluid-like, viscous state to a solid-like, slightly elastic state in a reversible manner comprising the step of increasing the temperature of a mixture comprising a polymer liquid and solid particles to an activating temperature.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 10 illustrates the infrared spectra taken with an infrared spectrometer obtained for the polybutene—new and oxidized, with and without $TiO_2$ particles.

DETAILED DESCRIPTION OF THE INVENTION

Figure 1:
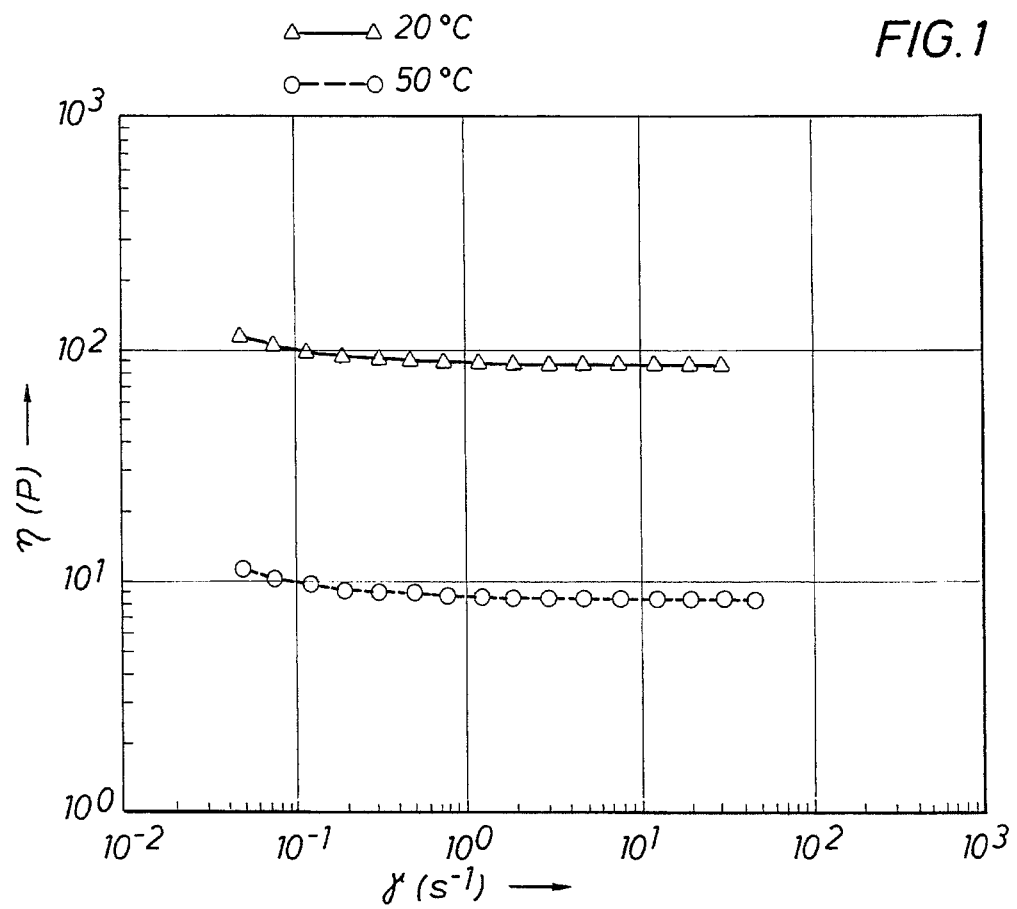
FIG. 1 is a plot of steady-shear viscosity as a function of the rate of shear strain for the oxidized polybutene fluid without any solid particles.

The present invention is directed to a reversibly heat stiffening suspension, comprising: a polymer liquid; and solid particles, wherein said suspension is reversibly activated by temperature to change from a liquid-like state to a solid-like state. Generally, in the heat stiffening reversible suspension of the present invention, the polymer liquid is an oxidizable polymer or a polymer containing polar group. Representative examples of suitable polymers useful in making the compositions or for use in the methods of the present invention include polybutene, and polyisoprene. Preferably, in the heat stiffening reversible suspension of the present invention, the solid particles are metal oxides. More preferably, the metal oxide is selected from the group consisting of titanium oxide powders, zirconium oxide powders, aluminum oxide powders, and molybdenum oxide powders.

Generally, in the heat stiffening suspension of the present invention, the suspension is in a liquid-like state at a temperature of below about 30° C. Generally, in the heat stiffening suspension of the present invention, the suspension in a liquid-like state has a viscosity of from about 70 Pa-s to about 100 Pa-s.

Generally, in the heat stiffening suspension of the present invention, the suspension is in a solid-like state at a temperature above about 40° C. Generally, in the heat stiffening suspension of the present invention, the suspension in a solid-like state has a viscosity of from about 1000 Pa-s to about 10 Pa-s, depending of the rate of shear.

Generally, in the heat stiffening suspension of the present invention, the polymer is contained in said suspension in a concentration of from about 60% to about 80%. Generally, in the heat stiffening suspension of the present invention, the metal oxide is contained in said suspension in a concentration of from about 20 vol % to about 40 vol %.

The present invention is also directed to a method of producing a heat stiffening suspension, wherein said suspension is reversibly activated by temperature to change from a liquid-like state to a solid-like state, comprising the step of contacting a polymer liquid with solid particles at an activating temperature.

The present invention is directed to a method of reversibly controlling the physical properties of particle-filled polymers from a fluid-like, viscous state to a solid-like, slightly elastic state in a reversible manner comprising the step of increasing the temperature of a mixture comprising a polymer liquid and solid particles to an activating temperature.

The present invention demonstrates that temperature changes have been found to cause dramatic changes in the rheological behavior of slurries of metal oxide particles in polymer fluids. These slurries transform from fluid, pourable slips to slightly rigid, shapable pastes when their temperature is increased from room temperature to approximately 40° C.–70° C. A return to the initial temperature accompanied by mechanical shear restores the original fluid properties to the system.

Rheological measurements, described below, characterize the materials, in one embodiment, as being Newtonian fluids at room temperature with no attraction or association among the molecules and particles. A Newtonian fluid maintains a constant viscosity with changing rates of shear. Similar measurements at elevated temperatures indicate the presence of a slightly elastic, shear rate dependent structure that offers a finite resistance to deformation by flow. Elasticity at higher temperatures may be due to interparticle association since, in one embodiment, the polymer fluid without particles remains Newtonian and decreases in viscosity with increasing temperature.

The thermally-activated, reversible transition between very fluid and slightly elastic behavior is unique and very useful. While many thermosetting gels described in the prior art exhibit a fluid-to-solid transition upon heating, the change produced is not reversible.

In a preferred embodiment, the materials systems, i.e., the solid particles which undergo this reversible change in properties are metal oxides. Representative examples of suitable metal oxides include titanium oxide ($TiO_2$), zirconium oxide ($ZrO_2$), aluminum oxide ($Al_2O_3$), and molybdenum oxide ($MoO_3$) powders.

In a preferred embodiment, the polymer liquid is a polybutene fluid. A representative example of polybutene fluid is Amoco polybutene. Another example of a suitable polymer liquid is polyisoprene. A person having ordinary skill in this art would readily recognize chemically equivalent polymer fluids.

It is critical to the workings of the present invention that the polymer component be oxidized. For example, as-received powders in oxidized polybutene can be used to produce the compositions of the present invention while oven-dried powders and/or new polybutene from the supplier can not. As-received powders that have not yet shown the transition in properties when suspended in oxidized polybutene are Fe, Ti, Cu, Al, $Fe_2O_3$, $Fe_2O_3$, and SiC. The compositions of the present invention that most clearly demonstrate the method of controlling the physical properties of the suspensions include as-received powders. Oven dried powders in oxidized polybutene do not produce the compositions representative of the present invention.

Macroscopic Observations

For two of the systems illustrated by the present invention (1 μm $ZrO_2$ and 3 μm $TiO_2$ in polybutene), the change in properties is easily observed at the macroscopic level. Slurries of the present invention that are pourable at room temperature became stiff and shapable when heated over a hot plate. A pourable slurry of the present invention has a consistency like latex paint; it pours from a tilted cup or lifted spatula and conforms to the shape of its container. A stiffened slurry of the present invention has a consistency like artists' oil paints; it does not pour from a cup or spatula, and maintains the shapes created in it with a spatula. A stiffened slurry of the present invention became pourable again if cooled and stirred.

The tendency of the cooler slurry to flow is indicative of its Newtonian rheology. A characteristic of Newtonian behavior is the absence of a yield point. That is, virtually any amount of stress on the material causes it to flow and dissipate energy. Obviously, the heated slurry possesses some finite yield point, below which flow is not induced. At least the weight of the slurry itself is not enough to induce flow, as evidenced by its ability to maintain its internal structure after shaping. Thus, there is elastic energy stored within the structural units of the heated slurry that causes it to resist deformation up to a critical point.

The analytical description of these properties is given below in the report of rheological measurements. The $TiO_2$, $ZrO_2$, $Al_2O_3$, and $MoO_3$ oxide all possess, to varying degrees, the rheological properties described below.

The present invention is also directed to a method of controlling the physical properties of particle-filled polymers. This process of the present invention changes the behavior of the material between a fluid-like (viscous) state and a solid-like (slightly elastic) state in a reversible manner.

The following examples are given for the purpose of illustrating various embodiments of the invention and are not meant to limit the present invention in any fashion.

EXAMPLE 1

Rehological Measurements

The rheological measurements used to describe the novel compositions of the present invention were made on a controlled-strain rheometer fitted with parallel plates. On this instrument, the slurry sample was placed between two circular plates. The lower plate was rotated, either in one direction or in oscillation, causing the sample to transmit torque to the upper plate and transducer from which rheological parameters were determined. Temperature was controlled by a liquid bath that surrounds the sample holder.

The parameters examined were: (1) steady-shear viscosity, $\eta$, which indicates the sample's resistance to flow at the prescribed rate of shear strain; (2) elastic (energy storage) modulus, $G'$, the tendency of the material to "spring" back to its original structure during oscillation at a set frequency of strain, $\omega$, (3) and amplitude of strain, % strain; and (4) viscous (energy loss) modulus, $G''$, the amount of flow that is not recovered during oscillatory strain; and (5) phase angle, (where phase angle, $\delta=\arctan(G''/G')$ and $0°<\delta<90°$), the ratio of viscous to elastic response.

EXAMPLE 2

Flow Properties of Oxidized Polybutene

FIG. 1 is a plot of steady-shear viscosity as a function of the rate of shear strain for the oxidized polybutene fluid without any solid particles. The nearly constant viscosity with changing shear rate is referred to as Newtonian behavior. The viscosity decreases with increasing temperature. Essentially, the polymer fluid remains Newtonian at decreasing viscosities with increasing temperature.

Figure 2A:
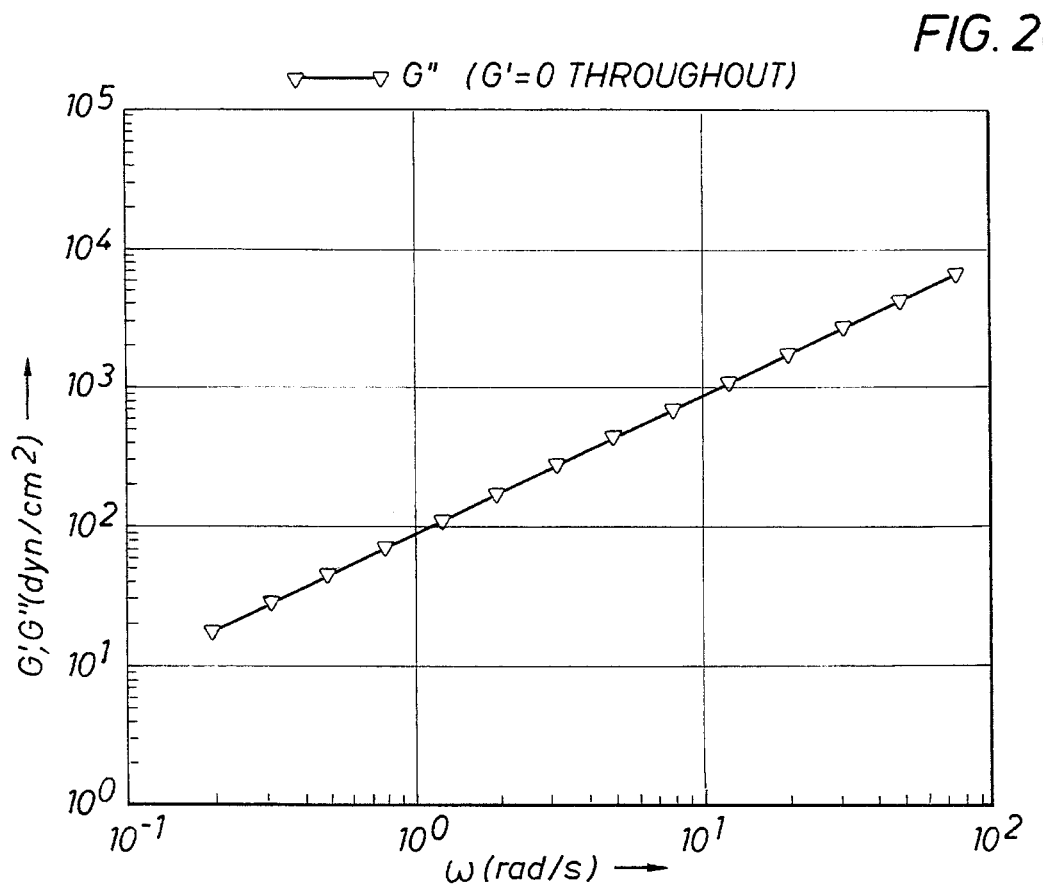
FIGS. 2A and 2B show the data for oscillating shear on the oxidized polybutene at 20° C. and 50° C., respectively.
Figure 2B:
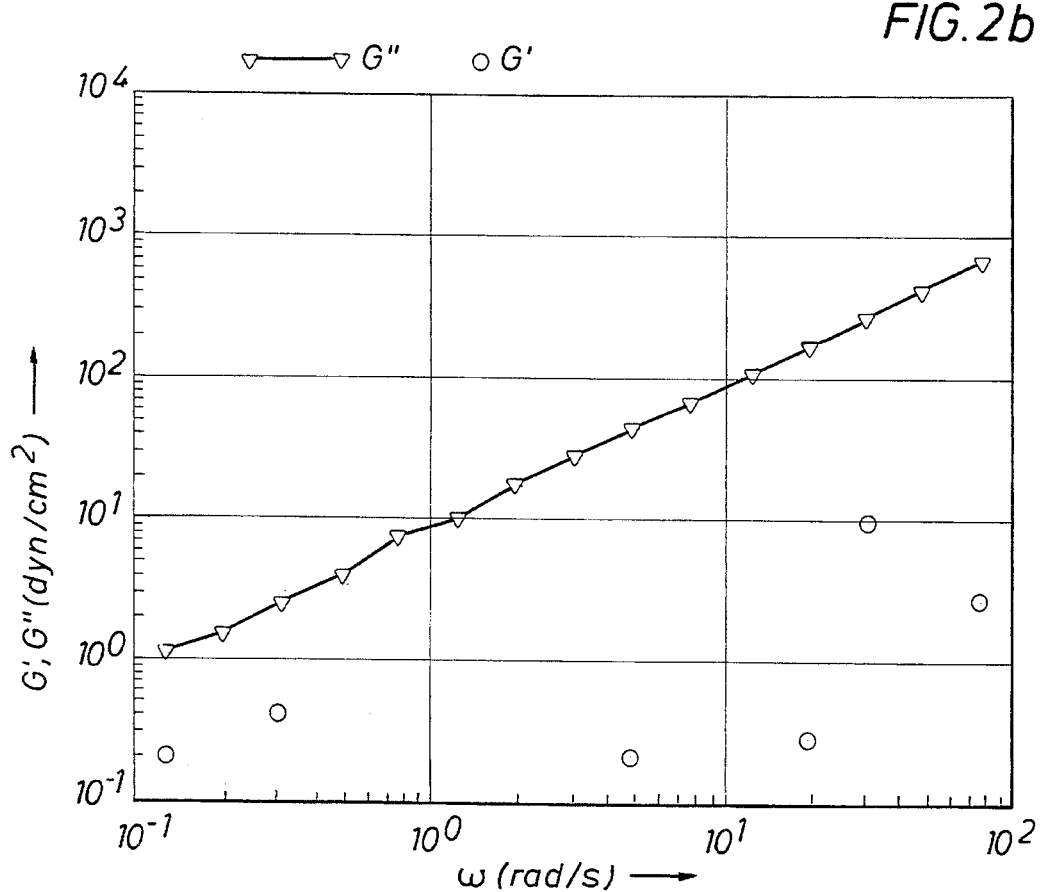
Figure 2C:
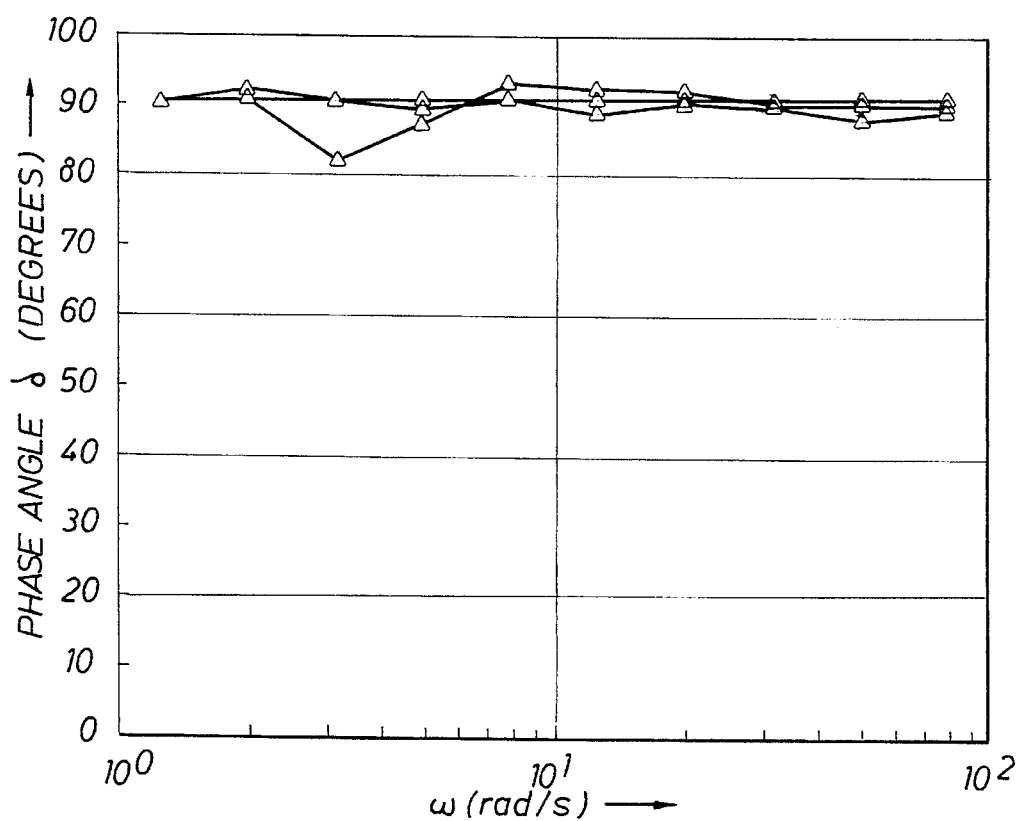
FIG. 2C shows phase angle vs oscillatory frequency.

Data for oscillating shear on the oxidized polybutene are shown in FIGS. 2A and 2B. At each temperature, a range of oscillation frequencies, $\omega$, was swept at a constant amplitude (1% strain). In both cases, the viscous/loss modulus, $G''$, is much greater than the elastic/storage modulus, $G'$, of the polymer, resulting in phase angles near 90° (FIG. 2C). A phase angle of 90° indicates purely viscous flow with no elasticity. Similarly, a 0° phase angle indicates a purely elastic response. Varying degrees of viscoelasticity, then, are represented by phase angles between the limits of 0° and 90°. Phase angles above 45° indicate more viscous than elastic behavior; and phase angles below 45° indicate more elastic than viscous behavior. The data shown in FIGS. 2A, 2B and 2C represent mostly viscous behavior for the pure polymer. These data indicate a lack of structure between the polymer molecules. The oscillatory data match the steady-shear data to confirm the simple, fluid nature (non-associating flow units) of the polybutene at each temperature.

EXAMPLE 3

Flow Properties of TiO$_2$-Polybutene Slurry

Figure 3A:
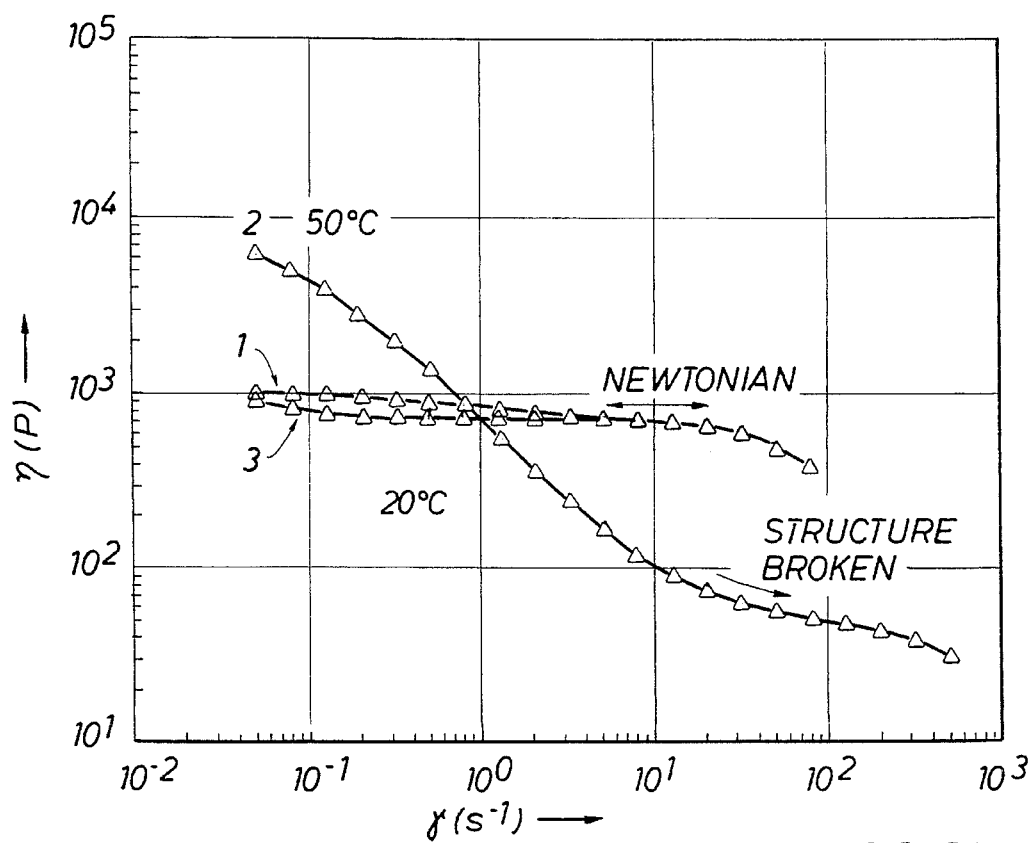
FIGS. 3A and 3B show the steady-shear data for a slurry of $TiO_2$ powder in oxidized polybutene (30 vol % powder, 3 μm diameter particles).
Figure 3B:
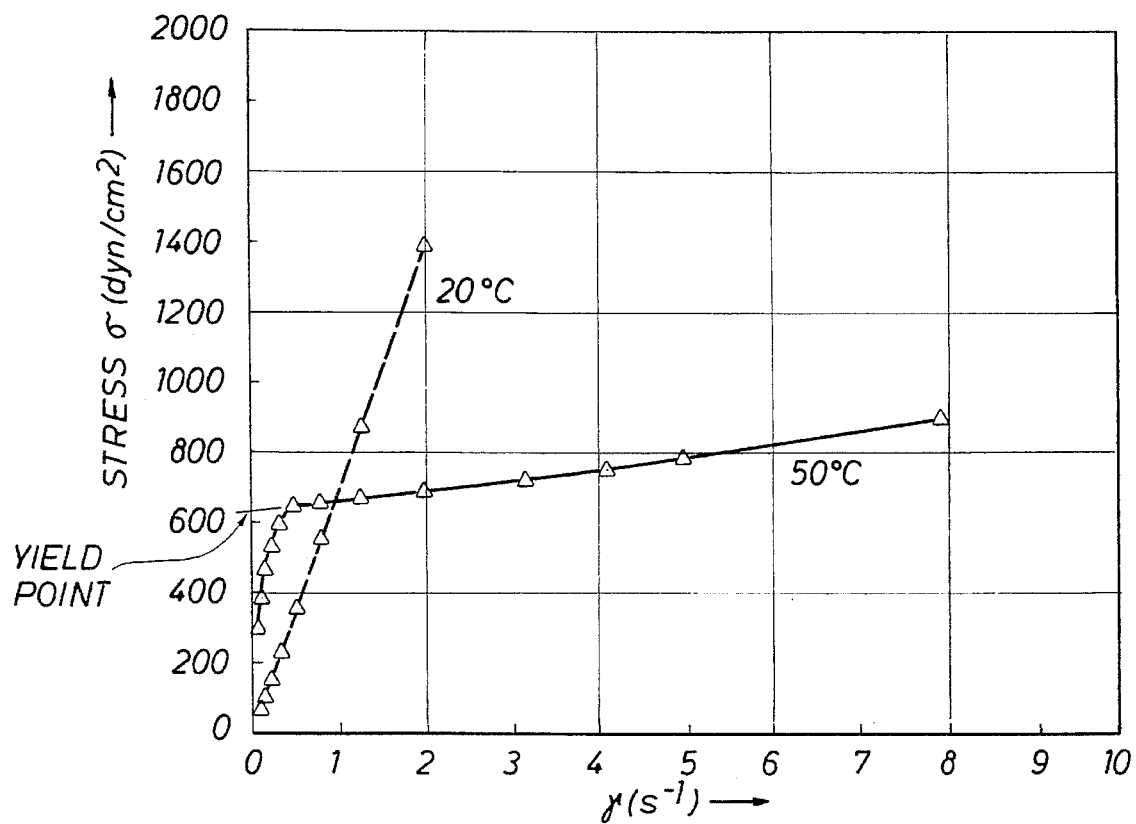

Steady-shear data for a slurry of TiO$_2$ powder in oxidized polybutene (30 vol % powder, 3 μm diameter particles) are shown in FIGS. 3A and 3B. FIG. 3A contains three sets of data, taken with a single sample in the sequence indicated: "1" at 20° C., then "2" at 50° C., then "3" at 20° C. again. Before and after heating to 50° C., the slurry was Newtonian at 20° C., with its viscosity higher than that of the pure fluid at the same temperature. At 50° C., however, the slurry is far from Newtonian. Its viscosity at 50° C. is a strong function of shear rate, decreasing with increasing shear rate (called "shear thinning"). This behavior indicates that a structure within the slurry is being broken down by the shearing action of the rheometer. At 50° C. the viscosity is higher than at 20° C. for very low rates of strain because of the heat-induced structure. As the shear rate increases, the structure is broken down and the viscosity falls below the 20° C. viscosity. It is noted that at the lowest strain rate available on the rheometer, the viscosity at 50° C. is nearly 10 times greater than at 20° C.

A plot of shear stress vs. rate (illustrated in FIG. 3B) reveals the presence or absence of a yield point for the slurries of the present invention. A yield point is a stress below which the material will not yield to flow. With data obtained on a controlled-strain rheometer, the best way to measure yield point is to extrapolate the linear portion of the curve down to zero shear rate. For a Newtonian material, there is no yield point, but for a shear thinning sample there can be. The definitive test for a yield point requires a controlled-stress rheometer, but the data here strongly suggest a yield point for the heated slurry. In view of the fact that the heated slurry was observed to maintain its shape and resist pouring, a yield point almost certainly exists.

EXAMPLE 4

Figure 4A:
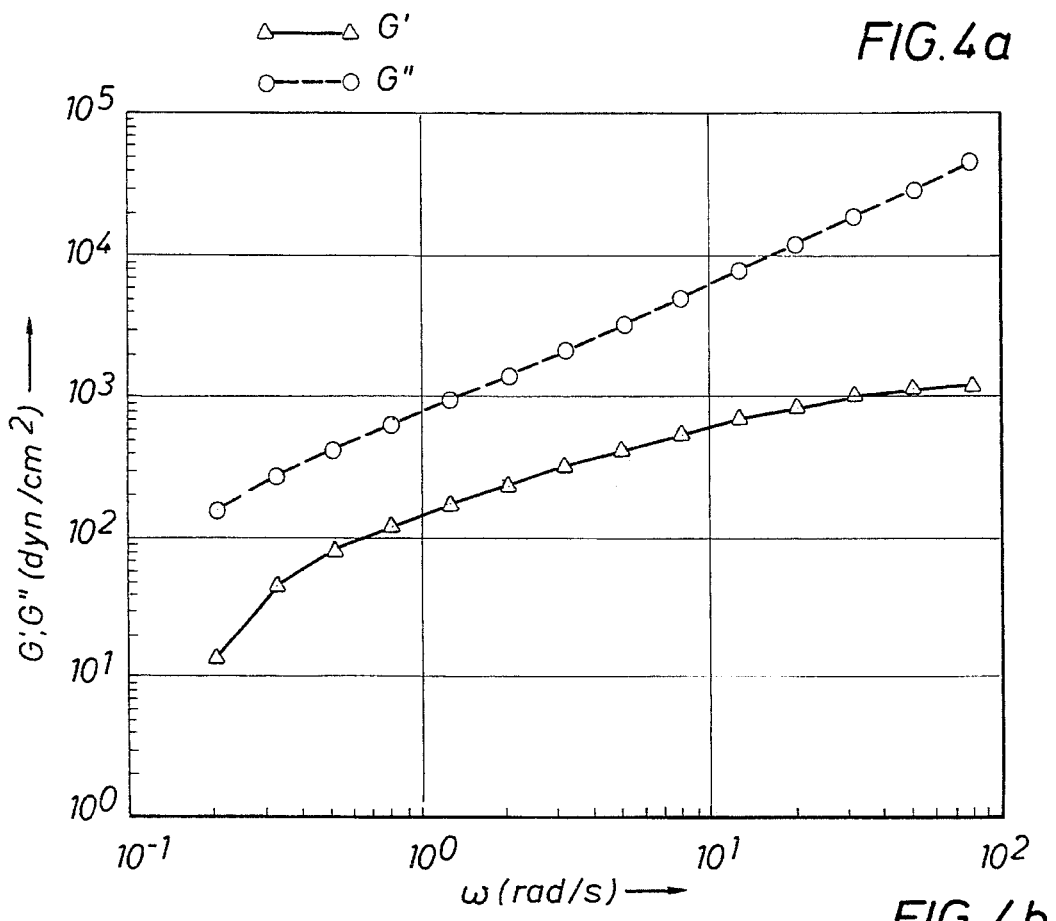
FIGS. 4A and 4B show the results of oscillatory-shear measurements on the $TiO_2$ slurry.
Figure 4B:
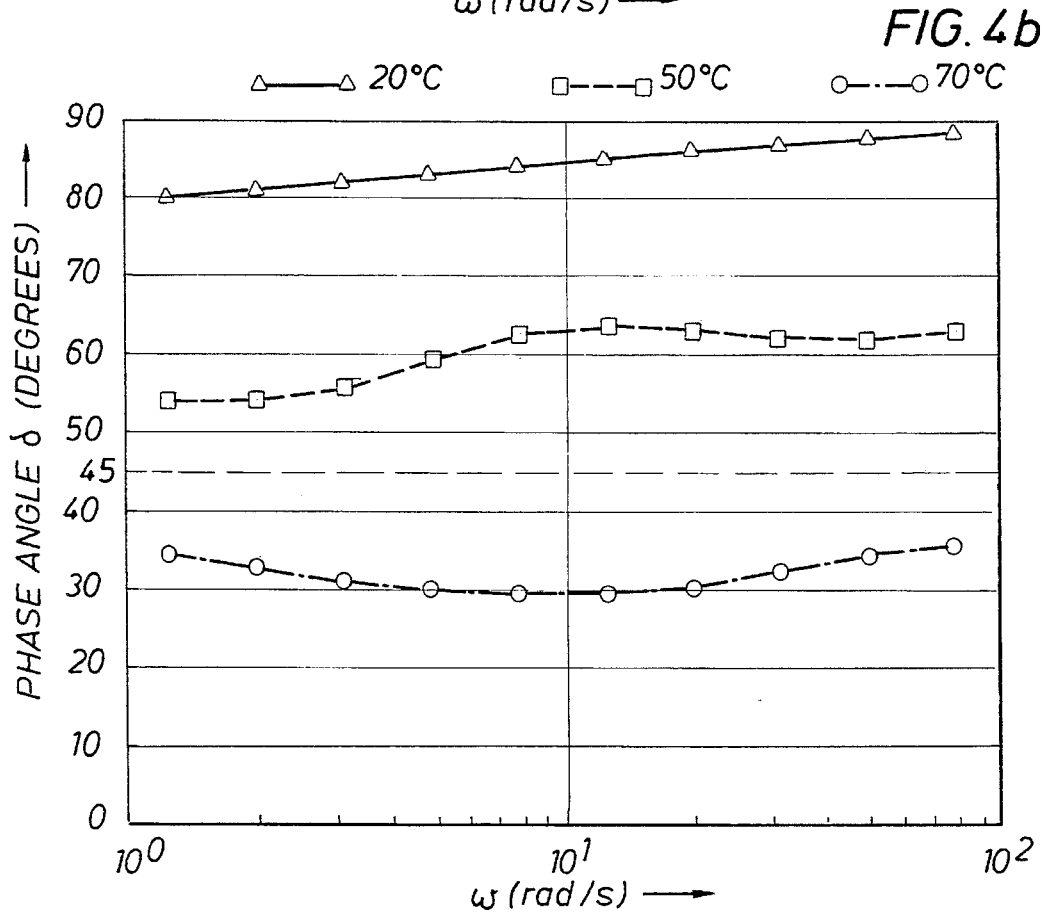

FIG. 4 illustrates the results of oscillatory-shear measurements on the TiO$_2$ slurry. FIG. 4A shows that at 20° C., as for the pure polymer, the viscous/loss modulus, $G''$, was consistently greater than the elastic/storage modulus, $G'$. Again, this indicates the absence of association or connectivity among the flow units of the slurry. FIG. 4B shows that at 50° C., however, the elastic modulus was comparable to the viscous modulus at most shear frequencies (at 1% strain). The Data shows the transition from essentially viscous behavior ($\delta>80°$) to mostly elastic behavior ($\delta<40°$) with a change in temperature from 20° C. to 70° C. Thus, the present invention demonstrates that the high temperature slurry possesses an internal structure that resists deformation at low strain rates, thus supporting the results of the steady-shear data.

EXAMPLE 5

Figure 5A:
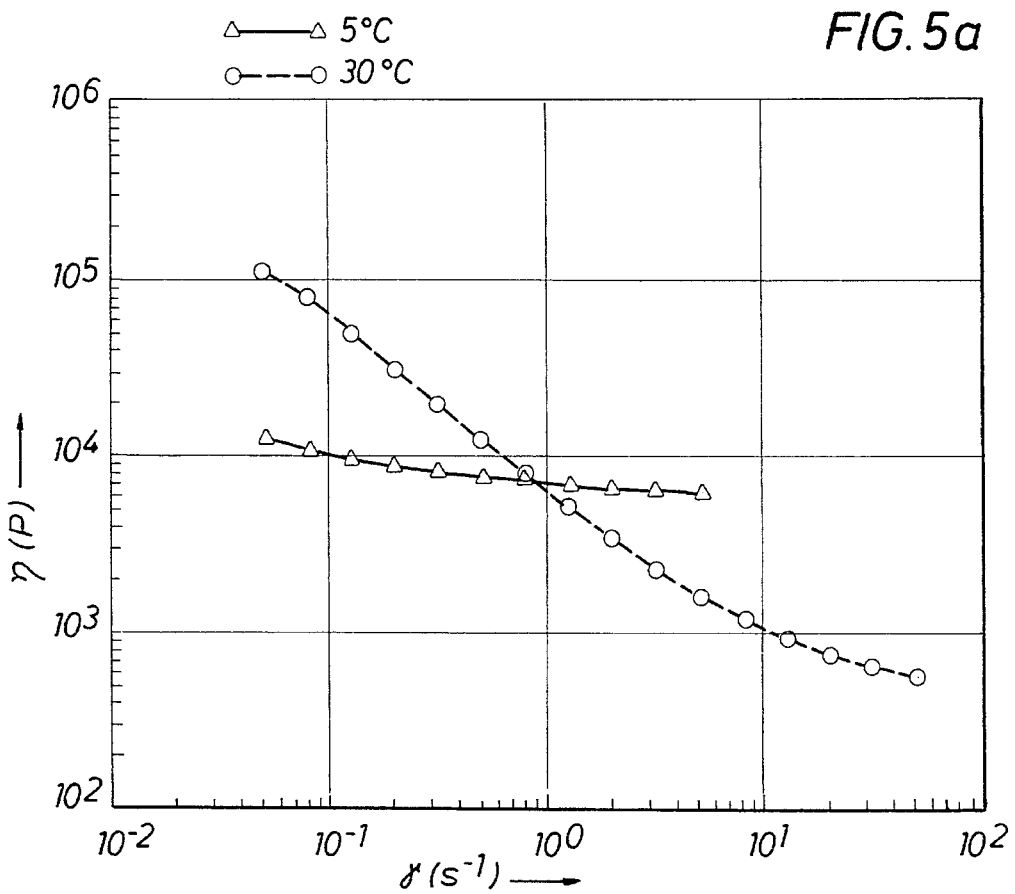
FIG. 5A shows steady-shear data for a slurry of $Al_2O_3$ powder in oxidized polybutene (30 vol % powder, 1.5 um diameter particles).
Figure 5B:
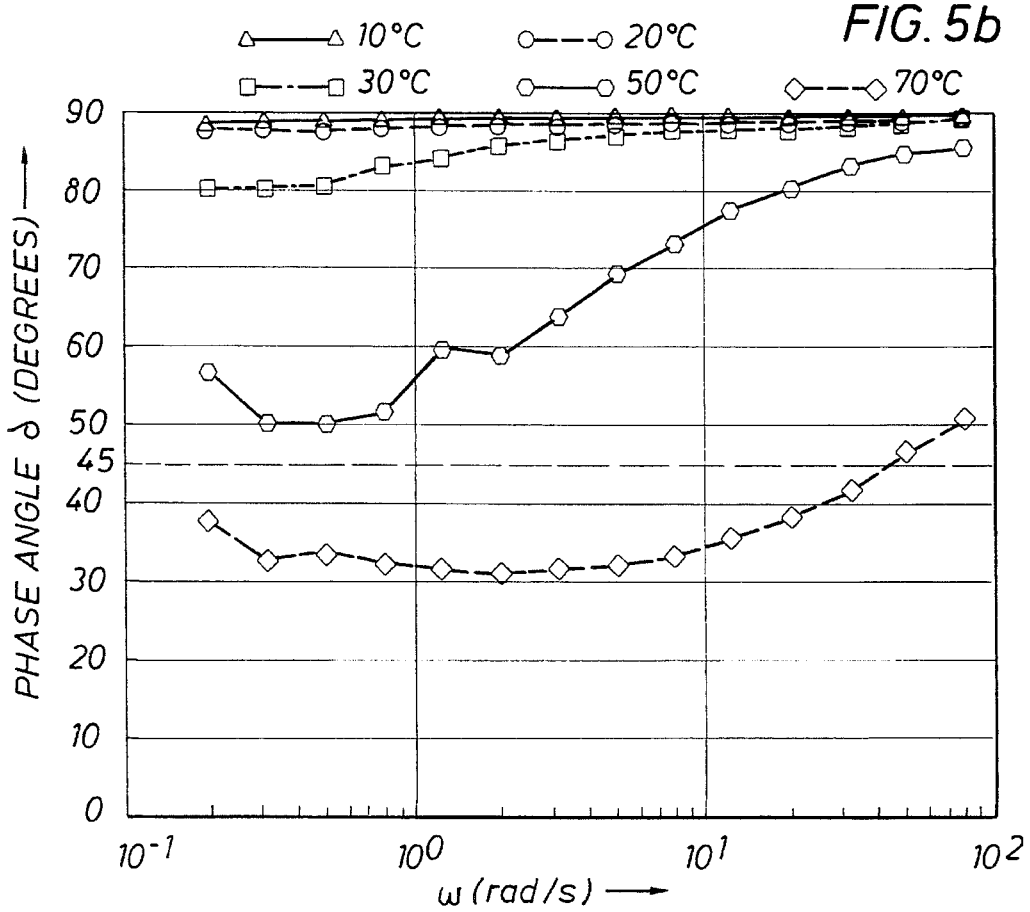
FIG. 5B illustrates the change in phase angles with temperature.

FIG. 5A shows steady-shear data for a slurry of Al$_2$O$_3$ powder in oxidized polybutene (30 vol % powder, 1.5 um diameter particles). Data are shown for 5° C. and 30° C. As for the TiO$_2$ slurry, this sample flows in a nearly Newtonian manner at the lower temperature, but is strongly shear-thinning at the higher temperature. At shear rates less than 1 s-1 the viscosity is greater at 30° C. than at 5° C. FIG. 5B illustrates the change in phase angles with temperature. The material is increasingly elastic (decreasing phase angles) with increasing temperature.

EXAMPLE 6

Figure 6A:
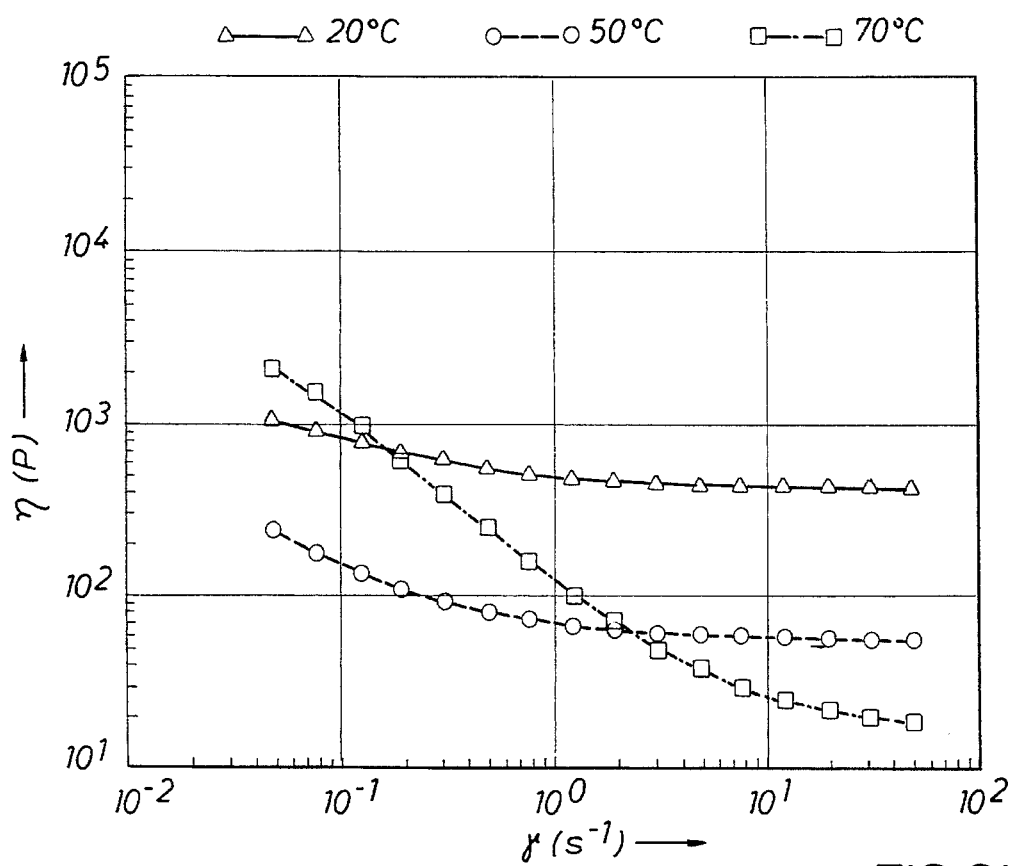
FIGS. 6A and 6B contain data for a slurry of slurry of ~2.5 μm $Al_2O_3$ particles (30 vol % powder in oxidized polyisobutylene-butene).
Figure 6B:
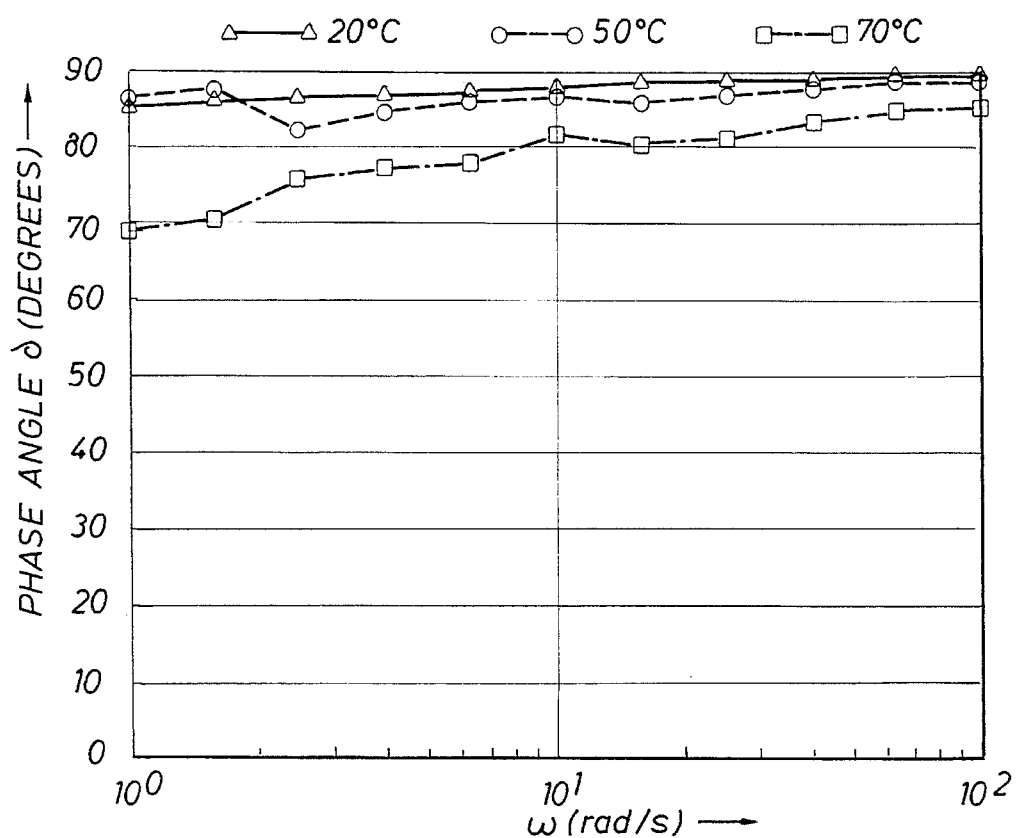

FIGS. 6A and 6B contain data similar to those in the previous example, but for a slurry of ~2.5 μm Al$_2$O$_3$ particles (30 below 0.2 s-1 the viscosity first decreases, then increases with increasing temperature. Again, the phase angle tends to decrease (elasticity increases) with increasing temperature (FIG. 6B). The temperature at which a given material system changes from liquid-like to solid-like behavior appears to increase with increasing particle size.

EXAMPLE 7

Figure 7A:
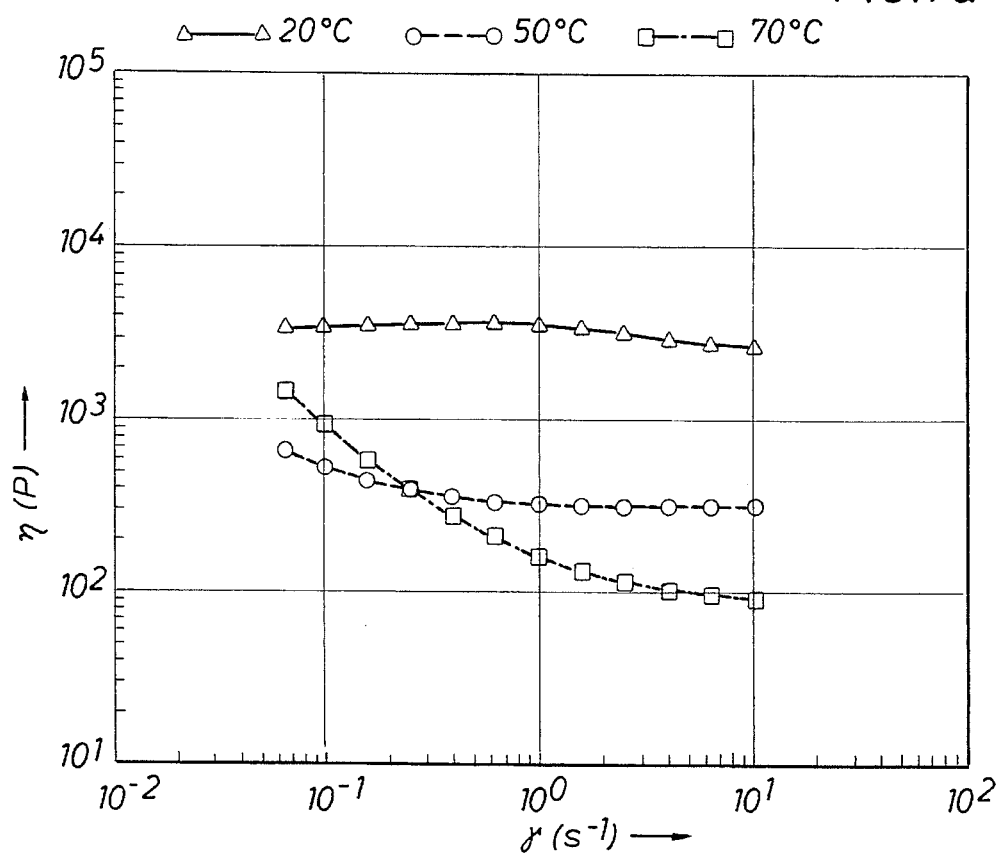
FIGS. 7A and 7B show data for a slurry of 40 vol % $MoO3$ in oxidized polybutene.
Figure 7B:
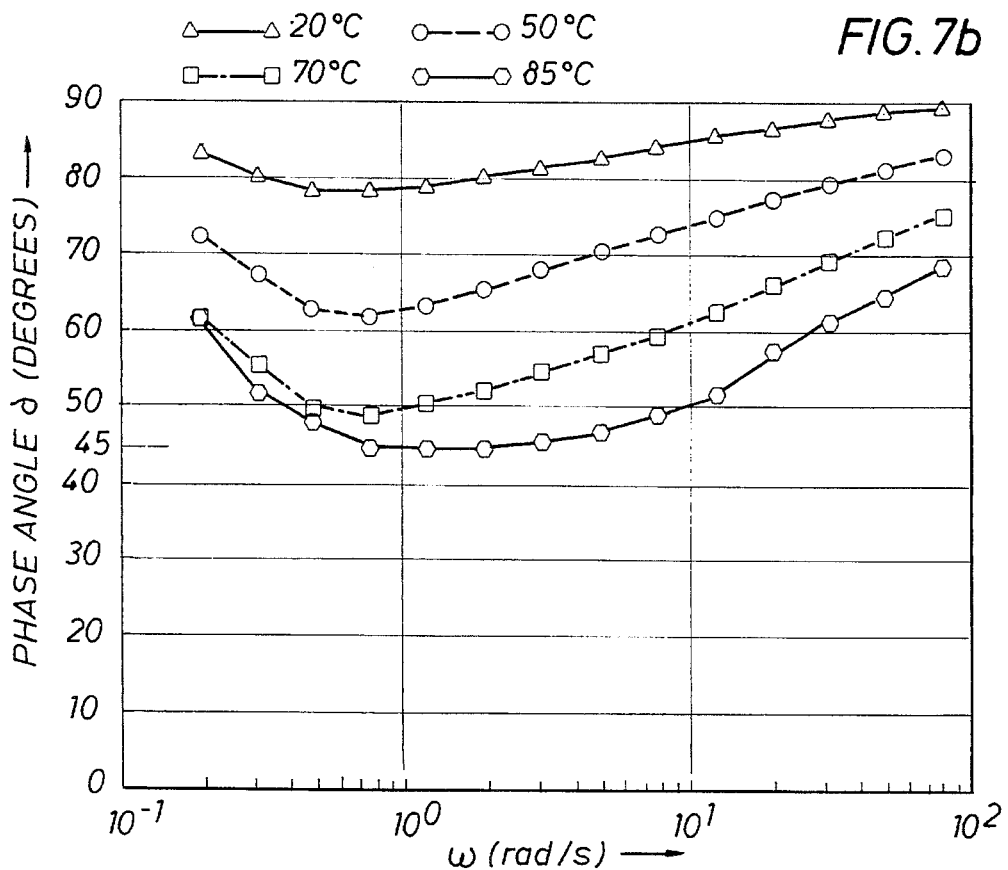

Data for a slurry of 40 vol % MoO3 in oxidized polybutene are shown in FIGS. 7A and 7B. FIG. 7A illustrates the initial decrease, then increase in low- shear-rate viscosity with increasing temperature. FIG. 7B shows the increase in elasticity with increasing temperature.

EXAMPLE 8

Figure 8A:
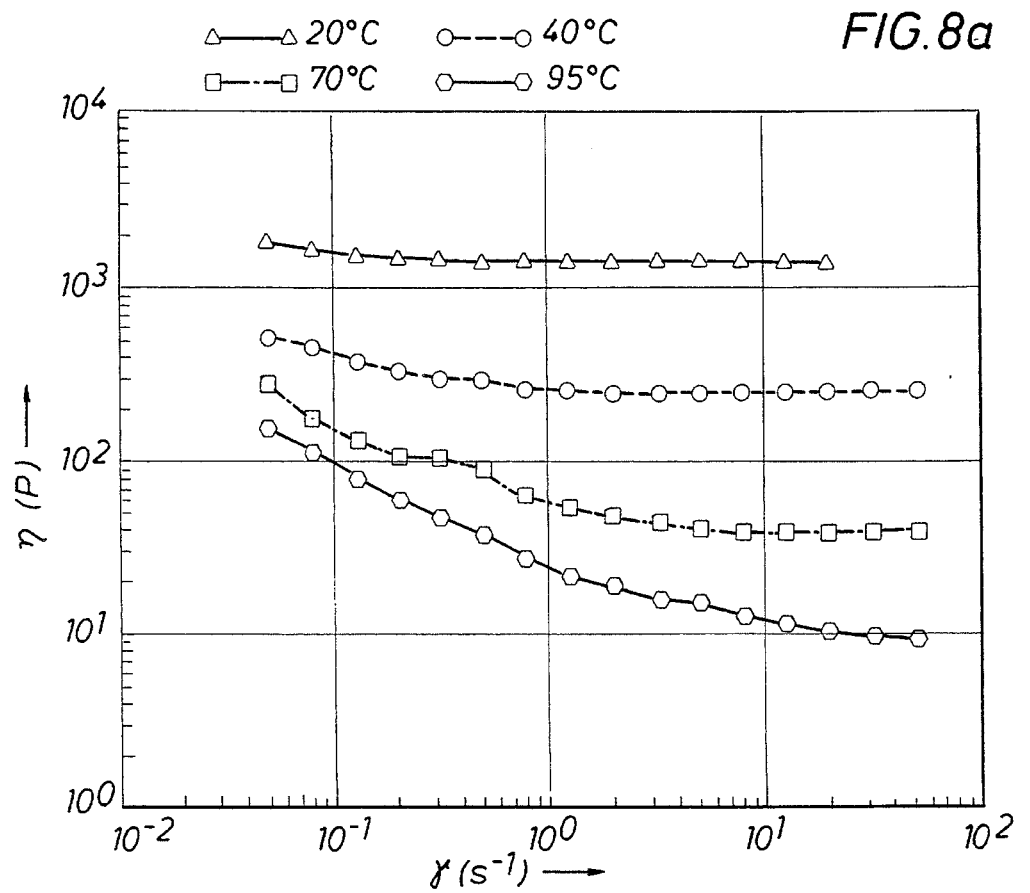
FIGS. 8A and 8B contain data for $ZrO2$ powder in oxidized polybutene (30 vol % powder, ~1 μm diameter particles).
Figure 8B:
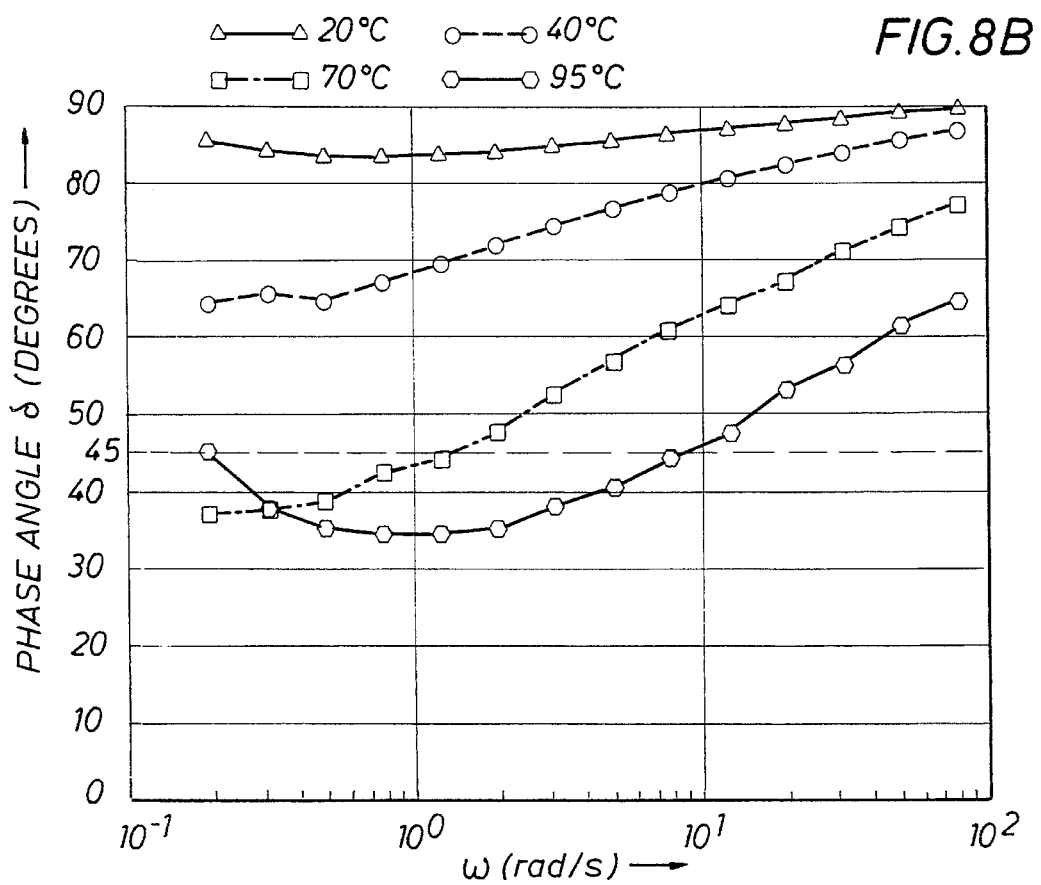

FIGS. 8A and 8B contain data for $ZrO_2$ powder in oxidized polybutene (30 vol % powder, ~1 μm diameter particles). FIG. 8A shows the steady-shear data for this sample. The material becomes increasingly shear-thinning with increasing temperature, indicating the aquisition of a structure among the flow units at higher temperatures. Although the measured viscosities do not show an increase with temperature, it is likely that the viscosity at very low shear rates (unattainable with the present testing equipment) does increase, as evidenced by the change in slope of the viscosity vs shear rate plots. FIG. 8B illustrates a strong increase in elasticity (decreasing phase angles) for this sample with increasing temperature. The increased elasticity, even in the absence of increased viscosity, is an example of the control of physical properties achievable via the present invention.

EXAMPLE 9

Figure 9A:
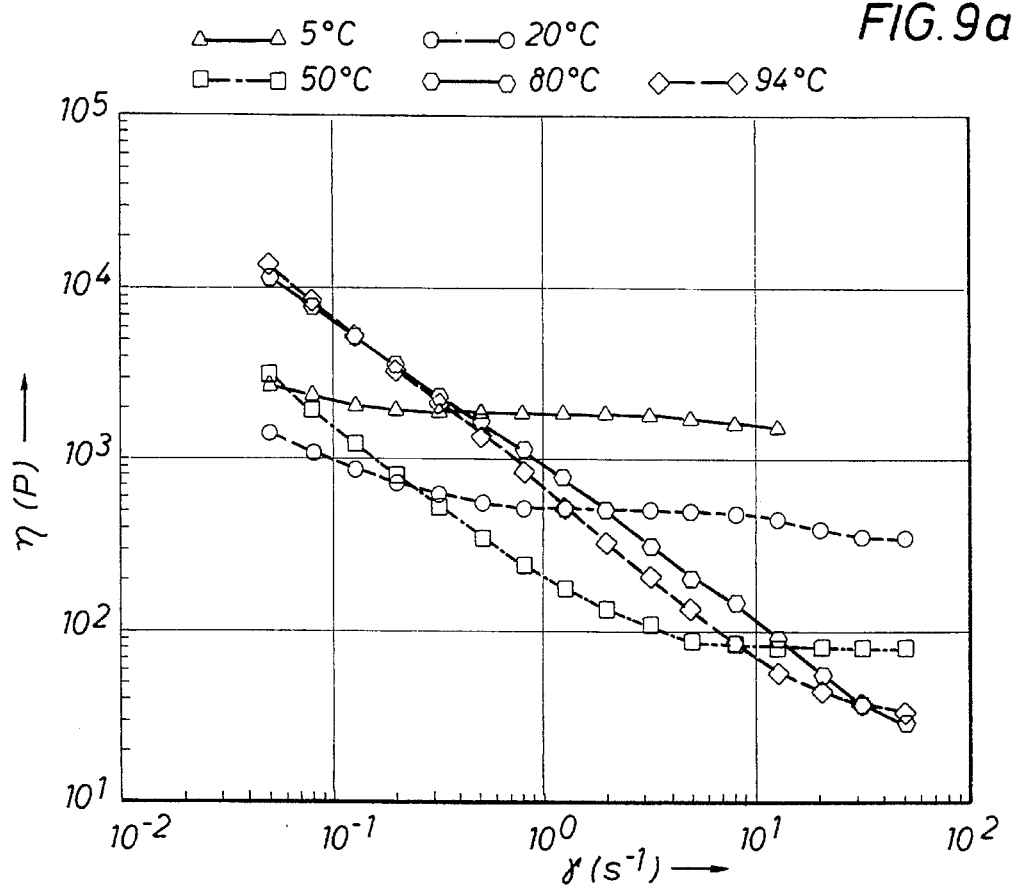
FIGS. 9A and 9B show data for a slurry of $TiO2$ powder in a polyisoprene liquid (30 vol % powder, 3 μm diameter particles).
Figure 9B:
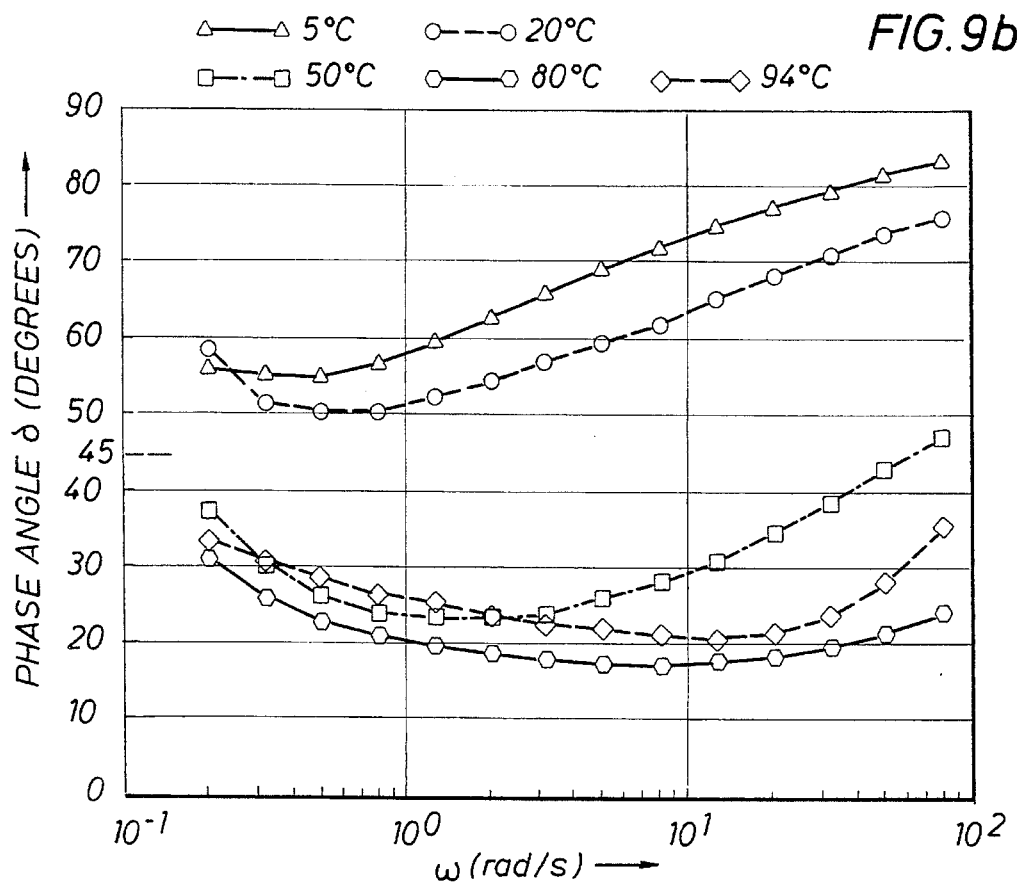

Data for a slurry of $TiO_2$ powder in a polyisoprene liquid (30 vol % powder, 3 μm diameter particles) are shown in FIGS. 9A and 9B. Similar to the slurries in polybutene, this sample demonstrates increased shear thinning, with a substantial increase in viscosity at low shear rates for increasing temperature (FIG. 9A). FIG. 9B illustrates the change from mostly viscous behavior ($\delta$>50°) to mostly elastic behavior ($\delta$>30°) at the higher temperatures.

EXAMPLE 10

FTIR

FIG. 10 illustrates data taken with an infrared spectrometer. Downward peaks occur at the frequencies at which the sample absorbs infrared radiation by vibrations that are characteristic of certain chemical bonds. Infrared spectra have been obtained for the polybutene—new and aged, with and without $TiO_2$ particles. The only significant difference among the spectra is at ~1735 $cm^{-1}$. A large peak appears at this wavenumber only for the "old" or aged polybutene (with and without $TiO_2$ powder). The location of this peak likely corresponds to the presence of C=O, carbonyl, type bonds. Carbonyl groups are likely to be formed in this product after very long exposure to air.

Though it is not determinable from the FTIR data collected so far, it is possible that the peak near 1735 $cm^{-1}$ is slightly broader for the sample that contains the ceramic powder. If the peak appears to be broadened because it is partially overlapped by a smaller peak of lower wavenumber, this indicates the interaction of the polymer C=O group with the ceramic powder (or possibly with adsorbed water on the powder surface). The interaction of C=O groups with a surface can cause their characteristic absorption peak to shift to lower wavenumbers.

EXAMPLE 11

Gel permeation chromatography

Figure 11A:
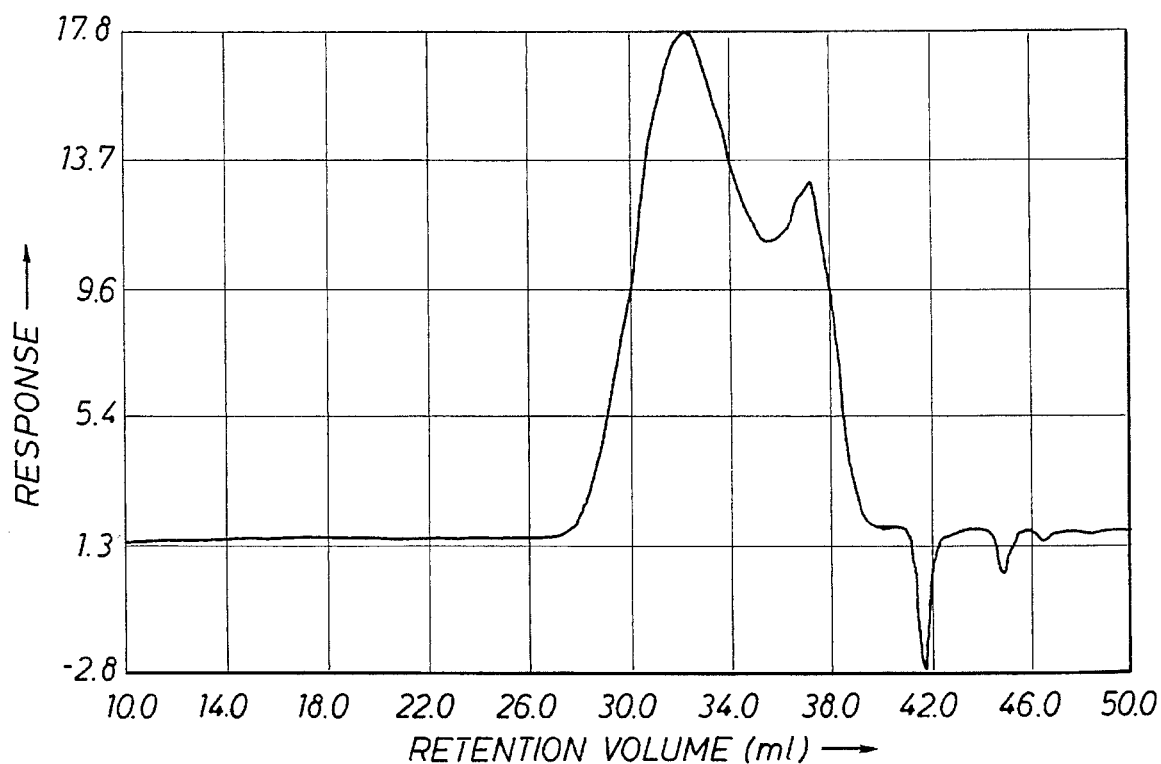
FIGS. 11A and 11B show the gel permeation chromatography measurements of the molecular weight distributions of new and oxidized polybutene.
Figure 11B:
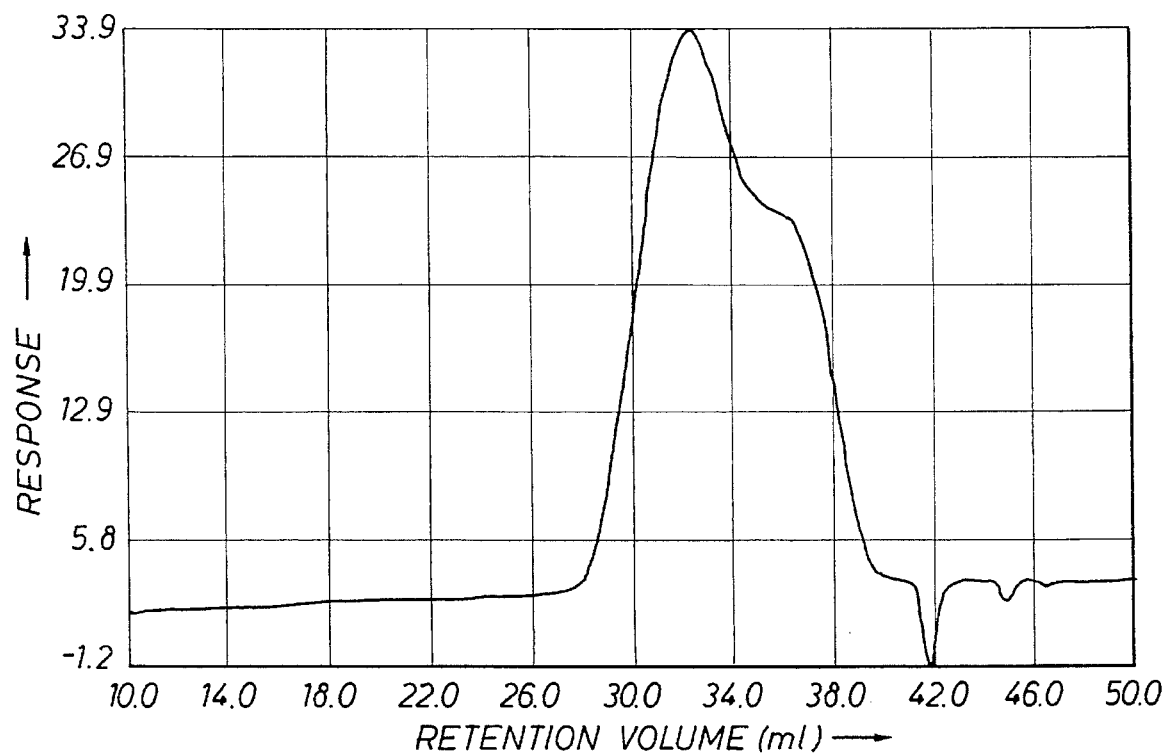

Gel permeation chromatography has been used to measure the molecular weight distributions of new and aged polybutene (FIGS. 11A and 11B). There was no significant difference between the molecular weights of the old and new polymer. These measurements imply that the oxidation process which occurs in the polymer does not produce any major structural changes. So, the cause of the rheological transition in slurries with the oxidized polybutene apparently does not lie solely in the physical shape or dimensions of the polymer molecules.

EXAMPLE 12

Applications

The reversible transition between associated and non-associated units in a slurry will be useful in the control of homogeneity among particles during powder processing. For example, powders of different sizes and densities can be well-mixed at a "cool" temperature when the slurry is fluid, and can then be held in their respective positions by warming the mixture. Sedimentation and segregation of unlike particles can be minimized by the resistance to flow at the warmer temperature. The reversibility will allow unused material to be made fluid again for re-use.

It has been suggested that the coagulated $Al_2O_3$/water slurries discussed previously might be useful in the kind of processing described above. The novel ceramic/polybutene slurries, of one embodiment of the present invention, though, have the added benefits that the interparticle association is reversible, and that the phenomenon occurs for a broader range of materials than does the salt-water coagulation.

It is specifically contemplated that the novel slurries of the present invention will be useful for painting or coating applications. At lower temperatures, the fluidity of the slurry and the relatively high viscosity of the liquid phase make the system ideal for homogenization by mixing. The hydrodynamic forces within the slurry are high in this condition, promoting deagglomeration and mixing of the particles. Then, when warmed, the slurry becomes spreadable (in fact, its viscosity at high shear rates is less than at the lower temperature) but stiff enough to resist dripping, running or sagging when at rest. Again, different types of particles (or pigments) that might tend to separate from one another in the fluid could be held in place at the warmer temperature.

The heat stiffening suspensions described in the present invention are expected to have applications in devices where mechanical motion is actuated by hydrostatic pressure. Clutches, brakes, and valves are examples of the mechanisms expected to benefit from the properties of the slurries that respond to electromagnetic fields. With the slurries described in the present invention, it has been observed that the normal force between the parallel plates of the rheometer increases when a test sample is heated. Thus, the hydrostatic pressure of these slurries increases with temperature. It is expected that applications in which the electro-/magneto-theological suspensions are useful are possible applications for the heat-stiffening slurries as well. The new materials made using the compositions and methods of the present invention would not require high electrical voltages of magnetic fields in order to perform.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A heat stiffening suspension, comprising:
   a polymer liquid, wherein said polymer liquid is selected from the group consisting of polybutene and polyisoprene; and oxides selected from the group consisting of $TiO_2$, $Al_2O_3$, $ZrO_2$ and $MoO_3$ and wherein said suspension is reversibly activated by temperature to change from a liquid-like state to a solid-like state.

2. The heat stiffening suspension of claim 1, wherein said polymer is contained in said suspension in a concentration of from about 60 vol % to about 80 vol %.

3. The heat stiffening suspension of claim 1, wherein said metal oxide is selected from the group consisting of titanium oxide powders, zirconium oxide powders, aluminum oxide powders and molybdenum oxide powders.

4. The heat stiffening suspension of claim 3, wherein said metal oxide is contained in said suspension in a concentration of from about 20 vol % to about 40 vol %.

5. The heat stiffening suspension of claim 1, wherein said suspension is in a liquid-like state at a temperature below about 30° C.

6. The heat stiffening suspension of claim 1, wherein said suspension in a liquid-like state has a viscosity of from about 70 Pa-s to about 100 Pa-s.

7. The heat stiffening suspension of claim 1, wherein said suspension is in a solid-like state at a temperature above about 40° C.

8. The heat stiffening suspension of claim 1, wherein said suspension in a solid-like state has a viscosity of from about 100 Pa-s to about 1000 Pa-s at shear rates less than $1\ s^{-1}$.

9. A method of producing a heat stiffening suspension, wherein said suspension is reversibly activated by temperature to change from a liquid-like state to a solid-like state, comprising the step of contacting a polymer liquid with solid particles at an activating temperature, wherein said polymer liquid is selected from the group consisting of polybutene and polyisoprene and said solid particles are metal oxides selected from the group consisting of $TiO_2$, $Al_2O_3$, $ZrO_2$ and $MoO_3$.

10. The method of claim 9, wherein said metal oxide is selected from the group consisting of titanium oxide powders, zirconium oxide powders, aluminum oxide powders, and molybdenum oxide powders.

11. The method of claim 9, wherein said suspension is in a liquid-like state at a temperature below about 30° C.

12. The method of claim 9, wherein said suspension in a liquid-like state has a viscosity of from about 70 Pa-s to about 100 Pa-s.

13. The method of claim 9, wherein said suspension is in a solid-like state at a temperature above about 40° C.

14. The method of claim 9, wherein said suspension in a solid-like state has a viscosity of from about 100 Pa-s to about 1000 Pa-s at shear rates less than $1\ s^{-1}$.

15. The method of claim 9, wherein said polymer is contained in said suspension in a concentration of from about 60 vol % to about 80 vol %.

16. The method of claim 10, wherein said metal oxide is contained in said suspension in a concentration of from about 20 vol % to about 40 vol %.

17. A method of reversibly controlling the physical properties of particle-filled polymers from a fluid-like, viscous state to a solid-like, slightly elastic state in a reversible manner comprising the step of increasing the temperature of a mixture comprising a polymer liquid and solid particles to an activating temperature, wherein said polymer liquid is selected from the group consisting of polybutene and polyisoprene and said solid particles are metal oxides selected from the group consisting of $TiO_2$, $Al_2O_3$, $ZrO_2$, and $MoO_3$.

18. The method of claim 17, wherein said metal oxide is selected from the group consisting of titanium oxide powders, zirconium oxide powders, aluminum oxide powders, and molybdenum oxide powders.

19. The method of claim 17, wherein said suspension is in a liquid-like state at a temperature below about 30° C.

20. The method of claim 17, wherein said suspension in a liquid-like state has a viscosity of from about 70 Pa-s to about 100 Pa-s.

21. The method of claim 17, wherein said suspension is in a solid-like state at a temperature above about 40° C.

22. The method of claim 17, wherein said suspension in a solid-like state has a viscosity of from about 100 Pa-s to about 1000 Pa-s at shear rates less than $1\ s^{-1}$.

23. The method of claim 17, wherein said polymer is contained in said suspension in a concentration of from about 60 vol % to about 80 vol %.

24. The method of claim 18, wherein said metal oxide is contained in said suspension in a concentration of from about 20 vol % to about 40 vol %.

* * * * *